Figure 1:
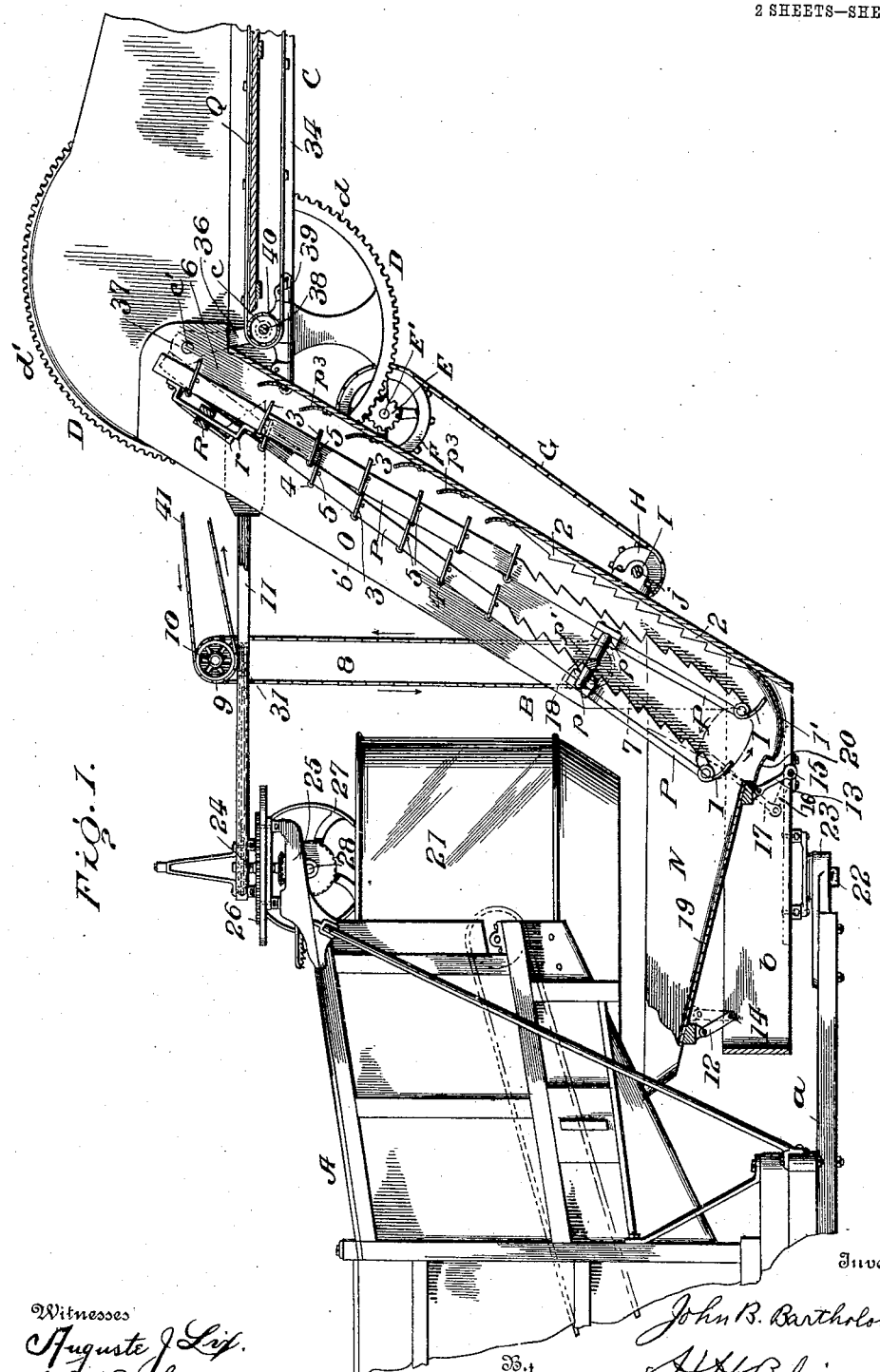

No. 874,918. PATENTED DEC. 24, 1907.
J. B. BARTHOLOMEW.
STRAW STACKER.
APPLICATION FILED MAY 1, 1905.

2 SHEETS—SHEET 1.

Witnesses
Auguste J Lif.
N. Curtis Lammond

Inventor
John B. Bartholomew
H. H. Bliss
By
Attorney

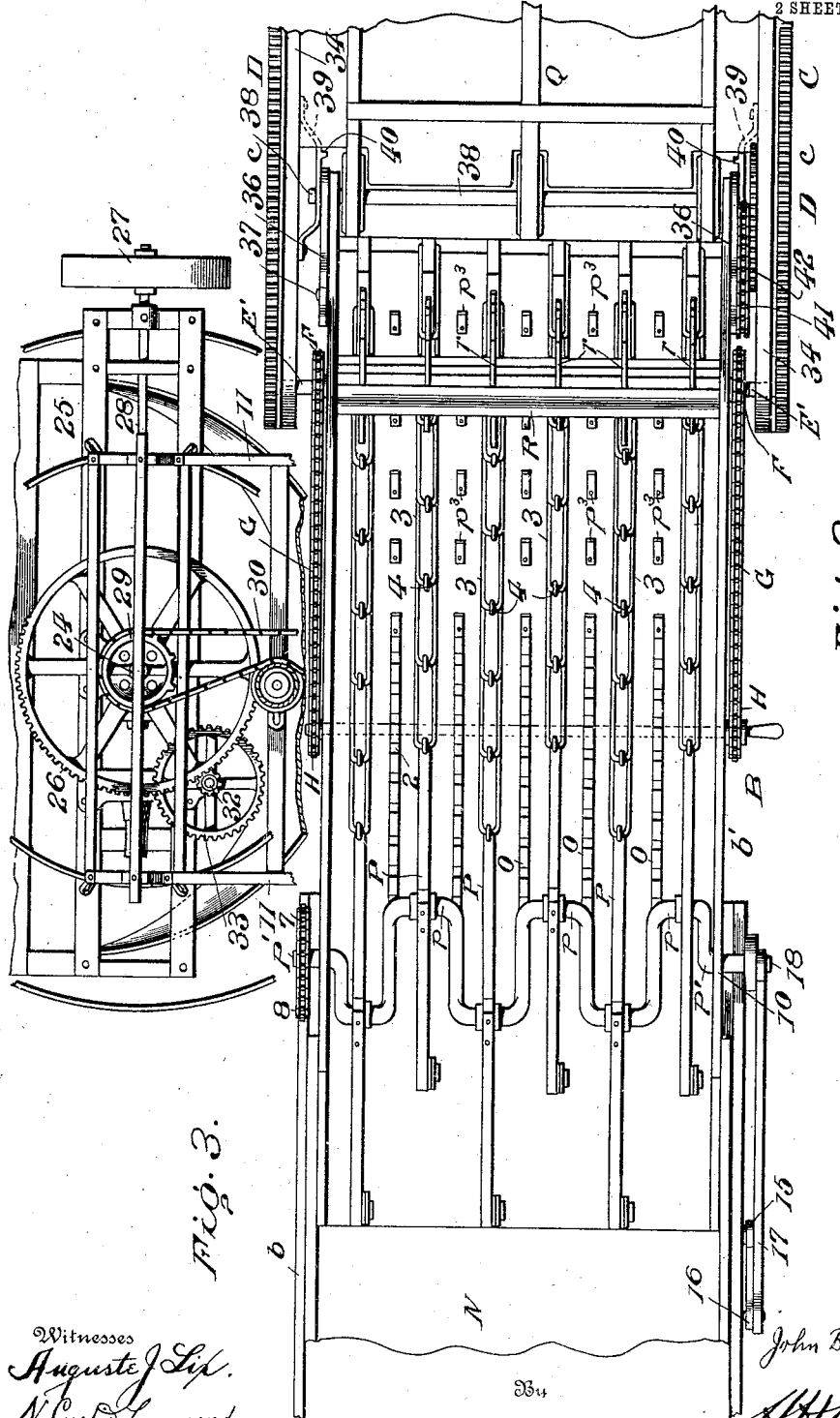

UNITED STATES PATENT OFFICE.

JOHN B. BARTHOLOMEW, OF PEORIA, ILLINOIS, ASSIGNOR, BY MESNE ASSIGNMENTS, TO THE SATTLEY STACKER COMPANY, OF INDIANAPOLIS, INDIANA, A CORPORATION OF MAINE.

STRAW-STACKER.

No. 874,918.  Specification of Letters Patent.  Patented Dec. 24, 1907.

Original application filed May 26, 1900, Serial No. 18,097. Renewed October 27, 1904, Serial No. 230,261. Divided and this application filed May 1, 1905. Serial No. 258,423.

*To all whom it may concern:*

Be it known that I, JOHN B. BARTHOLOMEW, a citizen of the United States, residing at Peoria, in the county of Peoria and State of Illinois, have invented certain new and useful Improvements in Straw-Stackers; and I do hereby declare that the following is a full, clear, and exact description of the invention, which will enable others skilled in the art to which it appertains to make and use the same.

This invention relates to improvements in the machines for receiving the straw from threshing and separating machines, and carrying it upward and backward to points remote therefrom and delivering it in such way that stacks can be built therewith.

Figure 1 is a side elevation, partly in section, of a portion of a threshing and separating machine, and of a stacker-mechanism embodying my improvements. Fig. 2 is a plan view of the same. Fig. 3 is a plan view of a portion of the mechanism for oscillating the stacker horizontally.

The stacking mechanism is herein shown as being attached directly to the thresher, but it will be understood that a number of the features of construction which I have devised can be applied to stacking mechanisms of other sorts.

In the drawings A indicates a part of the framework and casing of a thresher and separator, sufficient to illustrate the manner of applying my improvements thereto. At the bottom and the rear end of the separator frame there are sills or beams $a$ which extend backward to form a support for the stacker.

The stacker B is composed of two elements, one at $b$ and the other at $b'$. These are rigidly secured together, the shorter bottom part $b$ being approximately horizontal, and the part at $b'$ being sharply inclined therefrom. It is arranged on lines approaching the vertical. At the upper end it is connected with the section C by a hinge at $c$, this section being arranged to swing vertically around the hinge. This vertically swinging section has combined with it an improved mechanism for swinging it vertically which I have devised. Heretofore in machines of this sort use has been made of elongated arms extending beyond the pivots $c$, and with these arms have been connected ropes or cables which extended downward to drums on a shaft mounted transversely of and extending from side to side of the framework $b'$. But from practical experience with constructions of this earlier sort I have found that serious disadvantages are incident to them with respect to the application of power in lifting and controlling of the swinging section. The arms connected to that section furnish a leverage which varies within wide limits according as the section is in one or another of the positions in its path.

One of the purposes of the present invention is to provide a lifting mechanism which shall be more nearly constant in its leverage irrespective of the positions of the swinging section.

D indicates a curved rack, partly concentric with the axis at $c$, it being rigidly secured to the swinging section C. With this rack there engages a pinion E mounted on the section B. Preferably there are two of such racks, one at each side of the part C (Fig. 2), and two corresponding pinions. On the shaft $E'$ of the pinion E there is a sprocket wheel F, with which engages a chain G which extends downward to and engages with a second sprocket wheel H mounted on the shaft I situated at a line low enough to be readily accessible from the ground and to which a crank $j$ can be directly applied. I prefer to employ two sets of said gearing F, G, H, one at each side of the stacker (Fig. 2).

When it is desired to move the swinging section C in either direction it can be readily accomplished by means of these parts. If this section is to be carried from its rearmost position upward and over the vertical planes and downward to the top of the thresher the crank at $j$ is turned continuously in one direction until the stacker has been carried through the necessary movements; the mechanism herein provided for this purpose being superior to that which I have heretofore used and illustrated in my earlier application No. 736,148, filed November 7th, 1899, in this that when a rope or cord is used, as heretofore, it is necessary to rotate the power shaft first in one direction and then in the other, whereas with the present mechanism, as above described, the swinging section can be carried from one end of its path to the other by a continuous movement of the crank.

The curved rack D may be a continuous circle in case the section C moves through all of its paths around a single axis, as when a single elevator carrier belt is employed extending from the bottom of the part B to the outer end of the part C. But when the part C is arranged to describe part of its path around one axis and the other part of its path around another axis, such as $c'$, the rack can be shaped as shown at $d$, $d'$, in Fig. 1, so as to have a part concentric with each of the axes; but even in such case the pinion E will be adapted to be followed by the two curves of the rack and effect the entire movement of the section.

In another respect the present machine differs from those heretofore used. It has been common to use endless belts to elevate the straw from the receptacle or hopper at N, such belts extending from the inner side of the hopper first horizontally to the bottom of the rising part $b'$, thence upwards through the latter, and, either outward over the entire length of the section C and then back over the latter, down through the part $b'$ and under the hopper, or, after reaching the top of the part $b'$ returning directly down along the same. These long carriers necessary for this work are very objectionable as they are apt to get out of order and to be injured and displaced. One of the purposes of the present invention is to employ a superior mechanism for elevating the straw through this part of the machine, that is, the part at $b'$. I dispense with endless carriers and employ in place thereof a reciprocating elevator, as shown at O. This is formed of a series of bars P, P which extend from the bottom to the top of the part $b'$. Each of these is connected to a crank $p$ on a crank shaft $p'$. The throw of the cranks is so selected as that a wide opening shall be provided at the bottom of the elevator for the admission of the straw. While the elevator bars are thus adapted to be oscillated at their lower ends, they are provided at their upper ends with suitable guiding means. In the construction illustrated such means consist of rods or stirrups $r$ fixed on the bars P and adapted to reciprocate in apertures formed in a transverse guide bar R, the latter being fixed in the sides or frame of the part $b'$. Under the combined influence of the said operating and guiding means the lower ends of the elevator bars will be caused to travel with considerable range of movement in elliptical paths, as indicated in dotted lines in Fig. 1, where the direction of such movement is also indicated by arrows. As the lower ends of the bars P move upwardly and forwardly towards the straw delivery of the thresher they pass over a portion of the delivered straw, as the bars move downward they pass into the body of such straw, and as they thereafter move rearward the bars themselves (irrespective of the rearward projections or teeth 3, which latter operate only for the upward carrying of the straw) force the engaged straw rearward and gather it into the throat of the elevator between the bars P and the back of the stacker section $b'$. The arrangement of the elevator bars P in a more or less nearly upright position causes them to be transverse to the horizontal or transverse to the path of the straw as it comes from the straw delivery means of the thresher, so that the straw-gathering movement of the bars is in directions transverse to the length of the bars, while the elevating movement of the bars is in directions substantially lengthwise of them.

In order to facilitate the gathering in of the straw from the hopper N I prefer to provide the lower ends of the elevator bars with hooks or teeth 1. The inner faces of the lower ends of said bars are provided with notches, steps or shoulders adapted to engage positively with the straw on the upward movement of the bars and elevated for a distance equal to the throw of the cranks $p$, and the straw thus elevated is retained from downward movement by corresponding teeth or shoulders 2 attached to the bottom and rear board of the elevator frame.

Various forms of elevating and retaining devices may be combined with the bars P. Thus I have shown the upper part of the elevator frame as provided with upwardly pointing wire or metallic teeth $p^3$ adapted to permit the upward movement of the straw but to positively prevent its return. Coöperating with said teeth are oscillating fingers 3 pivotally mounted at 4 on the elevator bars, in staples or eyes suitable for such purpose. Said fingers are preferably U-shaped, as seen in Fig. 2, each with its two finger portions lying at the sides of the elevator bar and extending across the straw space towards the bottom or rear wall of the elevator. As the elevator bar moves downward the fingers 3 are free to turn in their bearings 4 into a more or less upwardly inclined position as may be rendered necessary by the resistance of the straw, and in such position are free to move downward or along through the straw until the elevator bars have reached their lowermost position. Thereupon as the bars are moved upward the fingers 3 will turn downward into a position substantially at right angles to the elevator bars, in which position they are arrested by stop pins 5. Thereafter as the bars move upward said fingers act efficiently to positively hold and elevate the straw. The mass of straw thus elevated passes from the part $b'$ through the throat 6, where it is delivered upon the outwardly traveling carrier Q mounted in the upper swinging section C, between the side boards or fenders 34 and the hopper boards 35 of said section.

The crank shaft $p'$ is provided with a chain wheel or pulley 7 which is engaged and rotated by a chain 8, driven in turn by a wheel 9 on a shaft 10 mounted transversely on the bars 11 which form the top supports of the elevator and stacker frame.

With the elevating means above described I prefer to combine an oscillatory or otherwise movable hopper in the nature of a chute by the action of which the straw is fed to the lower end of the elevator. To this end I mount the hopper N on links 12 and 13, the former of which are pivoted at 14 on the part $b$ and the latter of which are carried by a rock shaft 15. The latter is also provided with an arm 16 from which a pitman 17 extends to a wrist 18 on the shaft $p'$. By this means the hopper N is oscillated bodily towards and from the elevating devices, and the feeding of the straw towards the latter is promoted by the bottom 19 of the hopper which is inclined, as best seen at Fig. 1, the outer part of the hopper forming a space within which the straw is deposited to be grasped by the lower ends of the elevator bars. The outer edge of the hopper may be connected with the stationary part of the elevator by a strip or sheet 20 of flexible material, such as leather or canvas, to prevent the downward escape of straw. The straw is delivered from the threshing machine into the hopper N in any usual or preferred manner, as through a hood 21.

Recurring now to the vertical oscillation of the outer section C, and starting from the position shown in Figs. 1 and 2, said section will first turn (in the particular construction illustrated) on the axis $c$, the hinge being furnished by the through driving shaft 38 of the inner pulleys of the belt Q. This shaft, and the section C by means of brackets 39 attached to its side boards or fenders 34, are carried by links 36, in the lower ends of which said shaft has its bearings, and the upper ends of which are pivoted at $c'$ to the stacker section B, by bolts or studs 37. The action of these links allows the inner end of the carrier Q to be carried below the throat 6, and also, in folding, to turn over the part $b'$. 40 indicates lugs on the said brackets (Figs. 1 and 2) which, as the section C nears a vertical position, will encounter the rear sides of the links 36 and prevent further turning of the section relative to the links. Further turning or folding of the section C will be in company with the links on the pivots 37 and axial line $c'$. At the time when the lugs thus engage the links the centers of the rack segments $d'$ have been shifted to coincide with the line $c'$ and the lower ends of said segments will have reached the pinions E, so that the further inward folding of the section will be effected by the action of said pinions on the segments $d'$.

The stacker frame elements $b$, $b'$, together with the bars or frame 11, form a frame oscillatory in horizontal planes upon a vertical axis. The lower pivot of this axis is shown at 22 fitting in a suitable bracket 23 on the beams $a$. The upper pivot of said axis is indicated at 24 on which the frame 11 turns relative to the frame 25, which latter is attached to the thresher and carries any suitable oscillating mechanism. A suitable mechanism for this purpose, that is to say, for oscillating the stacker in horizontal planes, is fully described in my said application No. 736,148, and herein illustrated sufficiently for the purpose of the present invention. Of such mechanism 26 is the horizontal gear or segment rigidly connected with the frame 11 and concentric with the pivot 24. 32, 33 are the pinion and worm wheel for driving the gear 26. 27, 28 are the belt wheel and shaft from which the wheel 33 is driven.

The shaft 10 is actuated by suitable gearing from a horizontal sprocket 31 driven by a chain 30 from a sprocket 29 concentric with the pivot 24. The sprocket 29 is actuated by any suitable bevel or other gearing from the shaft 28. The belt Q is also, by preference, driven by mechanism such as I have set forth in my said application No. 736,148, that is to say by a chain 41 driven from the shaft 10 and actuating a train of gearing 42 the upper member of which is a sprocket and pinion on one of the studs 37, the intermediate member an idler pinion on one of the links 36, and the lower member a pinion on the shaft 38.

I do not herein claim broadly the outer section hinged on two transverse axes, the same being the subject in part of my application No. 18,098, filed May 26, 1900.

This application is a division of my pending application originally filed May 26, 1900, as Serial No. 18,097, and renewed Oct. 27, 1904, as Serial No. 230,261.

What I claim is:—

1. In a straw stacker, the combination with a thresher having straw delivery means and the inner elevator section having the upwardly extending frame, of the reciprocating carrier devices within the said upwardly extending frame, the swinging section connected to the upper end of the inner frame, the straw carrying devices supported therein, and a power mechanism connected with said straw carrying devices and with said reciprocating carrier devices to cause their coöperation, substantially as described.

2. In a straw stacker, the combination of a thresher having straw delivery means, an inner stacker section oscillatory in horizontal planes and comprising a reciprocating elevator and a hopper movable towards and from the lower end of said elevator, means for actuating said parts, and a vertically swinging section connected with the upper end of said inner section, and adapted to receive the straw from said reciprocating elevator, substantially as set forth.

3. In a straw stacker, the combination of a thresher having straw delivery means, an inner stacker section a reciprocating elevator therein comprising alternating bars, a vertically swinging stacker section connected with said inner section, a guiding means whereby the upper end of said reciprocating bars are directed and confined to form a throat for the exit of the straw to said swinging section, means for delivering the straw to the lower end of said elevator, and means for reciprocating the parts of said elevator, substantially as set forth.

4. In a straw stacker, the combination of a thresher having straw delivery means, the reciprocating elevator comprising bars having movable fingers for engagement with the straw, the upper swinging elevator section, and straw carrying devices therein for receiving the straw from said fingers, substantially as set forth.

5. In a straw stacker, the combination of an inner horizontally swinging stacker section, means for elevating the straw, an inwardly and outwardly moving hopper having an inclined bottom to deliver the straw to said elevator and a reciprocating mechanism connected both with said straw elevating means and with said hopper.

6. In a straw stacker, the combination of a thresher having straw delivery means, an inner stacker section arranged beyond the threshing and straw delivery means, mounted on a vertical axis and oscillatory in horizontal planes and adapted to receive the threshed straw, a reciprocating straw elevator on said inner stacker section and oscillatory in horizontal planes, power mechanism on the thresher at the top of the same and operating mechanism connecting said power mechanism with said reciprocating straw elevator, substantially as and for the purposes described.

7. In a straw stacker, the combination of a thresher, an inner stacker section swingable horizontally, mechanism at the top of the thresher connected with said section for swinging the same from side to side, a reciprocatory straw elevating means, and power devices acting to reciprocate said elevating means from said mechanism.

8. In a straw stacker, the combination of an inner stacker section extending upward at a steep angle, an outer stacker section, at the top of said inner section and swingable in vertical planes, a reciprocatory straw elevating means on said inner section, the lower part of which straw elevating means is movable in horizontally elongated curves or ellipses to gather the straw, and mechanism for reciprocating said elevating means.

9. In a straw stacker, the combination of an inner stacker section, an outer stacker section at the top of said inner section and swingable in vertical planes, and upwardly and downwardly reciprocating straw-engaging fingers operating on said inner section, the path of said fingers extending above said outer section.

10. In a straw stacker, the combination of a thresher having straw delivery means, a hopper and an upwardly extending frame between which frame and a wall of the hopper the straw is adapted to be received, the reciprocating carrier devices on said upwardly extending frame arranged to engage the straw held by the hopper to remove the same, the lower part of said reciprocating carrier devices being movable in horizontally elongated curves or ellipses toward and from said wall of the hopper to gather the straw and a power mechanism connected with said reciprocating carrier devices, substantially as described.

11. In a straw stacker, the combination of a thresher having straw delivery means, an inner stacker section arranged beyond the threshing and straw delivery means to receive the threshed straw, a steeply inclined straw elevator on said stacker section, which elevator is reciprocatory towards and from the straw delivery means in directions which are transverse to the length of the elevator, to gather the straw, and is also reciprocatory upward and downward to elevate the straw, and means for actuating the elevator.

12. In a straw stacker the combination, with a thresher having straw delivery means, of a hopper, the elevator having the upwardly extending frame, the reciprocating carrier devices within said frame, a power mechanism connected with said reciprocating carrier devices, and projections opposite to and extending toward said reciprocating carrier devices in contact with which projections the straw is pressed by said devices.

13. In a straw stacker the combination, of a thresher having straw delivery means, an upwardly extending frame between which frame and a wall of the hopper the straw is received, the reciprocating bars on said frame movable at their lower ends toward and from the said straw delivery means to continue the advancement of the straw, and projections opposite to and extending toward the reciprocating bars in contact with which projections the straw is pressed by said bars.

14. In a straw stacker, the combination of a stacker section extending upwardly, a reciprocating straw-elevating means on said section, the lower part of said straw-elevating means being also rotary, means for confining and directing the straw to the said lower part of the straw-elevating means, in directions transverse to the length of the latter and mechanism for operating said elevating means.

15. In a straw stacker, the combination of a threshing machine, a stacker section extending upwardly at the rear part of said machine, a reciprocating straw-elevating means on said stacker section, the lower part of which reciprocating straw-elevating means has a rotary motion to gather the straw as it comes from the threshing machine, and rearwardly and forwardly reciprocating straw advancing means acting to advance the straw toward the lower part of the said straw-elevating means.

16. In a straw stacker, the combination of a thresher having straw delivery means, an upwardly extending stacker section, the reciprocating carrier devices on said stacker section, a power mechanism connected with said reciprocating carrier devices, and projections opposite to and extending towards said reciprocating carrier devices in contact with which projections the straw is pressed by said devices.

17. In a straw stacker, the combination of a thresher having straw delivery means, a stacker section extending upwardly, a reciprocating elevator on said stacker section projecting beyond the straw delivery space at the upper part of said stacker section, and means for actuating the said elevator.

18. In a straw stacker, the combination of a thresher having straw delivery means, a hopper and straw elevator reciprocatory towards and from each other and arranged to take the straw from said delivery means, a stacker section oscillatory in horizontal planes and carrying said hopper and elevator, and mechanism for oscillating said stacker section and reciprocating the said hopper and elevator, substantially as set forth.

19. In a straw stacker, the combination of a thresher having straw delivery means, an upwardly extending stacker section, a reciprocating straw elevator also extending upwardly on said stacker section, said elevator being movable forwards and backwards towards and from the straw delivery means in directions transverse to the length of the elevator to gather the straw, and being also movable upwards and downwards in the direction of its length to elevate the straw, and means for actuating the elevator.

20. In a straw stacker, the combination of a threshing mechanism having straw delivery means, an inner stacker section arranged beyond the threshing and straw delivery means to receive the threshed straw, a cross-bar or guide at the upper part of the stacker section, a crank shaft at the lower part of the stacker section, reciprocating straw elevating bars mounted on said guide and on said crank shaft, and power mechanism for actuating the crank shaft, substantially as set forth.

21. In a straw stacker, the combination of a threshing mechanism having straw delivery means, an inner stacker section arranged beyond the threshing and straw delivery means to receive the threshed straw, and oscillatory in horizontal planes, a cross-bar or guide and a crank shaft on the stacker section, reciprocating straw elevating bars mounted on the said guide and on the crank shaft, and means for actuating the crank shaft.

22. In a straw stacker, the combination of a threshing mechanism having straw delivery means, an inner stacker section arranged beyond the threshing and straw delivery means to receive the threshed straw, and oscillatory in horizontal planes, an outer stacker section oscillatory in vertical planes, a cross-bar or guide and a crank shaft on the inner stacker section, reciprocating straw elevating bars mounted on the said guide and on the crank shaft, and means for actuating the crank shaft.

23. In a straw stacker, the combination of a thresher having straw delivery means, an upwardly extending stacker section, a reciprocating elevator also extending upwardly on said stacker section, the lower part of the elevator being rotary in horizontally elongated curves towards and from the said straw delivery means, and mechanism for actuating the said elevator.

24. In a straw stacker, the combination of a thresher having straw delivery means, an inner stacker section arranged beyond the threshing and straw delivery means, and adapted to receive the threshed straw, a reciprocating straw elevator on said inner stacker section and projections opposite to the elevator, in contact with which projections the straw is pressed by the elevator, substantially as set forth.

25. In a straw stacker, the combination of a threshing mechanism having straw delivery means, a steeply inclined stacker section arranged beyond the straw delivery means to receive the threshed straw delivered from the threshing mechanism, a reciprocating straw elevator on the said stacker section, arranged to have a gathering movement from front to rear, and a subsequently acting elevating movement at substantially right angles to such gathering movement and power mechanism on the thresher connected with said reciprocating straw elevator, substantially as set forth.

26. In a straw stacker, the combination of a thresher having straw delivery means, the inner elevator section having the upwardly extending frame, the reciprocating carrier devices within the said upwardly extending frame, and a power mechanism connected with the said reciprocating carrier devices to cause their operation, substantially as described.

27. In a straw stacker, the combination of a thresher having straw delivery means, the inner elevator section having the upwardly extending frame, bars mounted in the said frame to have a reciprocating movement for the elevation of the straw and extending upwards at an angle to the direction of the delivery of the straw to the said bars, and mechanism, for moving the front sides of the bars towards and from the straw to gather the same, and for simultaneously reciprocating the bars longitudinally, substantially as described.

In testimony whereof I affix my signature, in presence of two witnesses.

JOHN B. BARTHOLOMEW.

Witnesses:
CHAS. N. LA PORTE,
ROBERT N. McCORMICK.